US012719929B2

(12) United States Patent
Ben Henda et al.

(10) Patent No.: US 12,719,929 B2
(45) Date of Patent: Aug. 25, 2026

(54) SECURITY FOR GROUPCAST MESSAGE IN D2D COMMUNICATION

(71) Applicant: Telefonaktiebolaget LM Ericsson (publ), Stockholm (SE)

(72) Inventors: Noamen Ben Henda, Vällingby (SE); Markus Hanhisalo, Espoo (FI); Monica Wifvesson, Lund (SE); Yazid Lyazidi, Hässelby (SE); Shabnam Sultana, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 729 days.

(21) Appl. No.: 17/766,691

(22) PCT Filed: Oct. 5, 2020

(86) PCT No.: PCT/EP2020/077812
§ 371 (c)(1),
(2) Date: Apr. 5, 2022

(87) PCT Pub. No.: WO2021/069358
PCT Pub. Date: Apr. 15, 2021

(65) Prior Publication Data

US 2024/0080340 A1 Mar. 7, 2024

Related U.S. Application Data

(60) Provisional application No. 62/911,636, filed on Oct. 7, 2019.

(51) Int. Cl.
*H04L 9/40* (2022.01)
*H04W 12/03* (2021.01)
*H04W 12/76* (2021.01)

(52) U.S. Cl.
CPC .......... *H04L 63/162* (2013.01); *H04W 12/03* (2021.01); *H04W 12/76* (2021.01)

(58) Field of Classification Search
CPC ...... H04L 63/162; H04W 12/76; H04W 12/03
(Continued)

(56) References Cited

U.S. PATENT DOCUMENTS 9,197,429 B1 * 11/2015 Heninwolf ............ H04L 1/1835
2018/0132208 A1 * 5/2018 Pan ...................... H04W 72/20
(Continued)

OTHER PUBLICATIONS

3rd Generation Partnership Project, Technical Specification Group Services and System Aspects; System Architecture for the 5G System (5GS); Stage 2 (Release 16); 3GPP TS 23.501 V16.2.0, Sep. 2019, pp. 1-405.
(Continued)

*Primary Examiner* — Dereena T Cattungal
(74) *Attorney, Agent, or Firm* — COATS & BENNETT, PLLC

(57) ABSTRACT

The present disclosure provides a security mechanism to mitigate the risk of trackability of a D2D device engaged in groupcast communication. The security mechanism relies on the introduction of new parameters provisioned to the UE to facilitate the privacy protection of destination L2 identifiers used during group communication. The new parameters allow the UE to change the destination L2 Identifier so that an eavesdropper on the PC5 interface can no longer link several broadcast messages originating from the source UE and pertaining to a specific group.

18 Claims, 12 Drawing Sheets

(58) Field of Classification Search
USPC .......................................................... 713/168
See application file for complete search history.

(56) References Cited

U.S. PATENT DOCUMENTS

| | | | | |
|---|---|---|---|---|
| 2019/0349719 | A1* | 11/2019 | Pattan | H04W 4/40 |
| 2020/0026290 | A1* | 1/2020 | Lim | G05D 1/0022 |
| 2020/0028736 | A1* | 1/2020 | Park | H04W 72/23 |
| 2020/0351966 | A1* | 11/2020 | Karampatsis | H04W 76/11 |
| 2020/0389257 | A1* | 12/2020 | Kung | H04W 4/06 |
| 2021/0105789 | A1* | 4/2021 | Freda | H04W 4/40 |
| 2021/0219116 | A1* | 7/2021 | Perras | H04W 4/40 |
| 2021/0385023 | A1* | 12/2021 | Wang | H04W 72/20 |
| 2021/0410129 | A1* | 12/2021 | Freda | H04W 72/20 |
| 2022/0123904 | A1* | 4/2022 | Wang | H04L 5/0055 |
| 2022/0141834 | A1* | 5/2022 | Chang | H04W 76/40 370/312 |
| 2022/0159751 | A1* | 5/2022 | Bangolae | H04W 4/40 |
| 2022/0174458 | A1* | 6/2022 | Peng | H04L 5/0037 |
| 2022/0338283 | A1* | 10/2022 | Wang | H04W 76/14 |
| 2023/0073658 | A1* | 3/2023 | Fu | H04L 63/083 |
| 2024/0080340 | A1* | 3/2024 | Ben Henda | H04L 63/162 |

OTHER PUBLICATIONS

3rd Generation Partnership Project, "Technical Specification Group Services and System Aspects; Architecture enhancements for 5G System (5GS) to support Vehicle-to-Everything (V2X) services (Release 16)", 3GPP TS 23.287 V16.0.0, Sep. 2019, pp. 1-49.

3rd Generation Partnership Project, "Technical Specification Group Services and System Aspects; Procedures for the 5G System (5GS); Stage 2 (Release 16)", 3GPP TS 23.502 V16.2.0, Sep. 2019, pp. 1-525.

3rd Generation Partnership Project, "Technical Specification Group Services and System Aspects; Security architecture and procedures for 5G system (Release 16)", 3GPP TS 33.501 V16.0.0, Sep. 2019, pp. 1-196.

3rd Generation Partnership Project, "Technical Specification Group Services and System Aspects; Policy and Charging Control Framework for the 5G System (5GS); Stage 2 (Release 16)", 3GPP TS 23.503 V16.2.0, Sep. 2019, pp. 1-104.

3rd Generation Partnership Project, "Technical Specification Group Services and System Aspects; Security aspect for LTE support of Vehicle-to-Everything (V2X) services (Release 15)", 3GPP TS 33.185 V15.0.0., Jun. 2018, pp. 1-10.

3rd Generation Partnership Project, "Technical Specification Group Services and System Aspects; Study on Security Aspects of 3GPP support for Advanced V2X Services (Release 16)", 3GPP TR 33.836 V0.3.0, Aug. 2019, pp. 1-36.

3rd Generation Partnership Project, "Technical Specification Group Services and System Aspects; Architecture enhancements for 5G System (5GS) to support Vehicle-to-Everything (V2X) services (Release 16)", 3GPP TS 23.287 V1.1.0, Jul. 2019, pp. 1-50.

Ericsson, "Update consistently use of V2X communication", 3GPP SA WG2 Meeting #131, Feb. 25-Mar. 1, 2019, pp. 1-5, Tenerife, Spain, S2-1902604.

Ericsson, "A solution against V2X UE tracking based on PC5 destination L2 identifier", 3GPP TSG-SSA WG3 Meeting #97, Nov. 18-22, 2019, pp. 1-2, Reno, US, S3-194155.

3GPP, 3rd Generation Partnership Project; Technical Specification Group Services and System Aspects; Study on Security Aspects of 3GPP support for Advanced V2X Services (Release 16), Draft 3GPP TR 33.836 V0.3.0 (Aug. 2019).

3Gpp, 3rd Generational Partnership Project; Technical Specification Group Services and System Aspects; Architecture enhancements for 5G System (5GS) to support Vehicle-to-Everything (V2X) services (Release 16); 3GPP TS 23.287 V1.1.0 (Jul. 2019).

* cited by examiner

SECURITY FOR GROUPCAST MESSAGE IN D2D COMMUNICATION

TECHNICAL FIELD

The present disclosure relates generally to device-to-device (D2D) communications and, more particularly to security measures for groupcast messages in D2D communications.

BACKGROUND

The Third Generation Partnership Project (3GPP) security standardization working group SA3 has finalized the security specification for the Release 15 of the Fifth Generation (5G) System in TS 33.501. The 5G System, also known as New Radio (NR), includes many new features that require the introduction of new security mechanisms. For example, the 5G System integrates non-3GPP access (e.g., Wireless Local Area Network (WLAN)) alongside 3GPP access (e.g., NR and Long Term Evolution (LTE)) in a seamless manner. More precisely, in 5G, a user equipment (UE) can run the usual service access procedure independently of the underlying access.

Currently, there is an ongoing study in the 3GPP SA3 working group looking into the security issues and solutions for the support of Vehicle-to-Everything (V2X) in 5G Systems. The study is being documented in TR 33.836. Among the key issues identified, a few are related to privacy for communication over the PC5 interface. Among the key issues being discussed are the threats from the disclosure of the Layer 2 (L2) identifiers over the PC5 interface and the risk that an eavesdropper can track UEs based on the L2 identifiers.

A mitigation strategy against exposure of the L2 identifiers is described in TS 33.185. This mitigation strategy is used in the Evolved Packet System (EPS) implementation of V2X. The standard requires the UE to regularly refresh the L2 identifiers and assign their values randomly. It is also specified that identifiers in the application layer and the lower layers (e.g., L2) be changed simultaneously. Thus, the application layer must indicate to the lower layers when such identifiers change. It should be noted that the implementation of V2X in EPS includes only broadcast type communication over PC5. The destination L2 identifiers in broadcast communication are fixed depending on the type of application and are not UE-specific. For this reason, it was deemed that the privacy mechanism described above is only needed for the source L2 identifiers on the sender side.

The implementation of V2X in 5G includes support for groupcast communication. It is not clear whether the existing privacy protection mechanism intended for broadcast communication will work for groupcast communication. As described in TS 23.287, the destination L2 identifiers may be group-specific. Consequently, using the same destination L2 identifier during group communication by the same UE can be used by an eavesdropper to track the UE. This threat is mitigated by the legacy mechanism, i.e., UE changing it is source Layer 2 ID, but is not completely removed.

Further, it has been agreed by SA2 that information on the casting type of a V2X packet transmission will be indicated by upper layer to the access stratum (AS) layer. Since different casting types may influence resource allocation strategy by the base station, information on whether the UE is authorized for groupcast communication needs to be supported in the authorization information of the UE.

SUMMARY

The present disclosure provides a security mechanism to mitigate the risk of trackability of a UE (e.g., V2X device) engaged in groupcast communication over a sidelink. The security mechanism relies on the introduction of new privacy parameters that indicate a set of group-specific destination L2 identifiers. The group-specific destination identifiers are unique to the group. The UE selects a destination L2 identifier from the set to use as the current destination L2 identifier and can change the current destination L2 identifier periodically or responsive to a predetermined event to provide privacy protection.

The security mechanism can be implemented without any additional signaling other than the inclusion of additional parameters in existing signaling messages. The security protocol mitigates against the UE tracking threat while engaging in groupcast communication. The security protocol reuses the legacy mechanism for source L2 Identifier privacy protection.

A first aspect of the disclosure comprises methods implemented by a UE configured for groupcast communication with members of a device group. The method comprises receiving a privacy parameter indicating a set of group-specific destination identifiers for a device group and sending a first groupcast message to members of the device group, the first groupcast message including a selected one of group-specific destination identifiers indicated for the device group as a current destination identifier.

A second aspect of the disclosure comprises a UE configured for groupcast communication with members of a device group. The UE is configured to receive a privacy parameter indicating a set of group-specific destination identifiers for a device group and to send a first groupcast message to members of the device group, the first groupcast message including a selected one of group-specific destination identifiers for the device group as a current destination identifier.

A third aspect of the disclosure comprises a UE configured for groupcast communication with members of a device group. The UE comprises an interface circuit configured for device-to-device communication over a sidelink, and processing circuitry configured to receive a privacy parameter indicating a set of group-specific destination identifiers for a device group and to send a first groupcast message to members of the device group, the first groupcast message including a selected one of group-specific destination identifiers for the device group as a current destination identifier.

A fourth aspect of the disclosure comprises a computer program comprising executable instructions that, when executed by a processing circuit in a UE, causes the UE to perform the method according to the first aspect.

A fifth of the disclosure comprises a carrier containing a computer program according to the fourth aspect, wherein the carrier is one of an electronic signal, optical signal, radio signal, or computer readable storage medium.

A sixth aspect of the disclosure comprises methods implemented by a UE configured for groupcast communication with members of a device group. The method comprises receiving a privacy parameter indicating a set of group-specific destination identifiers for a device group and receiving, from a sending device, a first groupcast message including a first destination identifier. The method further comprises determining whether the first destination identifier is among the set of group-specific destination identifiers for the device group and generating a first result and handling the groupcast message depending on the first result.

A seventh aspect of the disclosure comprises a UE configured for groupcast communication with one or more UEs in a device group. The UE is configured to receive a privacy parameter indicating a set of group-specific destination identifiers for a device group and to receive, from a sending device, a first groupcast message including a first destination identifier. The UE is further configured to determine whether the first destination identifier is among the set of group-specific destination identifiers for the device group and to generate a first result and handling the groupcast message depending on the first result.

An eighth aspect of the disclosure comprises a UE configured for groupcast communication with members of a device group. The UE comprises an interface circuit configured for device-to-device communication over a sidelink, and processing circuitry configured to receive a privacy parameter indicating a set of group-specific destination identifiers for a device group and to receive, from a sending device, a first groupcast message including a first destination identifier. The processing circuitry is further configured to determine whether the first destination identifier is among the set of group-specific destination identifiers for the device group and to generate a first result and handling the groupcast message depending on the first result.

A ninth aspect of the disclosure comprises a computer program comprising executable instructions that, when executed by a processing circuit in a UE, causes the UE to perform the method according to the sixth aspect.

A tenth of the disclosure comprises a carrier containing a computer program according to the ninth aspect, wherein the carrier is one of an electronic signal, optical signal, radio signal, or computer readable storage medium.

An eleventh aspect of the disclosure comprises methods implemented by a base station configured to support groupcast communication by UEs of a device group. The method comprises receiving a request for sidelink resources from a user equipment (UE), determining whether the UE is authorized for groupcast communication, and allocating sidelink resources to the UE for a groupcast communication responsive to determining that the UE is authorized for groupcast communication.

A twelfth aspect of the disclosure comprises a base station configured to support groupcast communication by UEs in a device group. The base station is configured to receive a request for sidelink resources from a user equipment (UE), determine whether the UE is authorized for groupcast communication, and allocate sidelink resources to the UE for a groupcast communication responsive to determining that the UE is authorized for groupcast communication.

An thirteenth aspect of the disclosure comprises a base station configured to support groupcast communication by UEs in a device group. The base station comprises an interface circuit configured for communication with one or more UEs in the device group, and processing circuitry configured to receive a request for sidelink resources from a user equipment (UE), determine whether the UE is authorized for groupcast communication, and allocate sidelink resources to the UE for a groupcast communication responsive to determining that the UE is authorized for groupcast communication.

A fourteenth aspect of the disclosure comprises a computer program comprising executable instructions that, when executed by a processing circuit in a UE, causes the UE to perform the method according to the eleventh aspect.

A fifteenth of the disclosure comprises a carrier containing a computer program according to the fourteenth aspect, wherein the carrier is one of an electronic signal, optical signal, radio signal, or computer readable storage medium.

DETAILED DESCRIPTION

Figure 1:
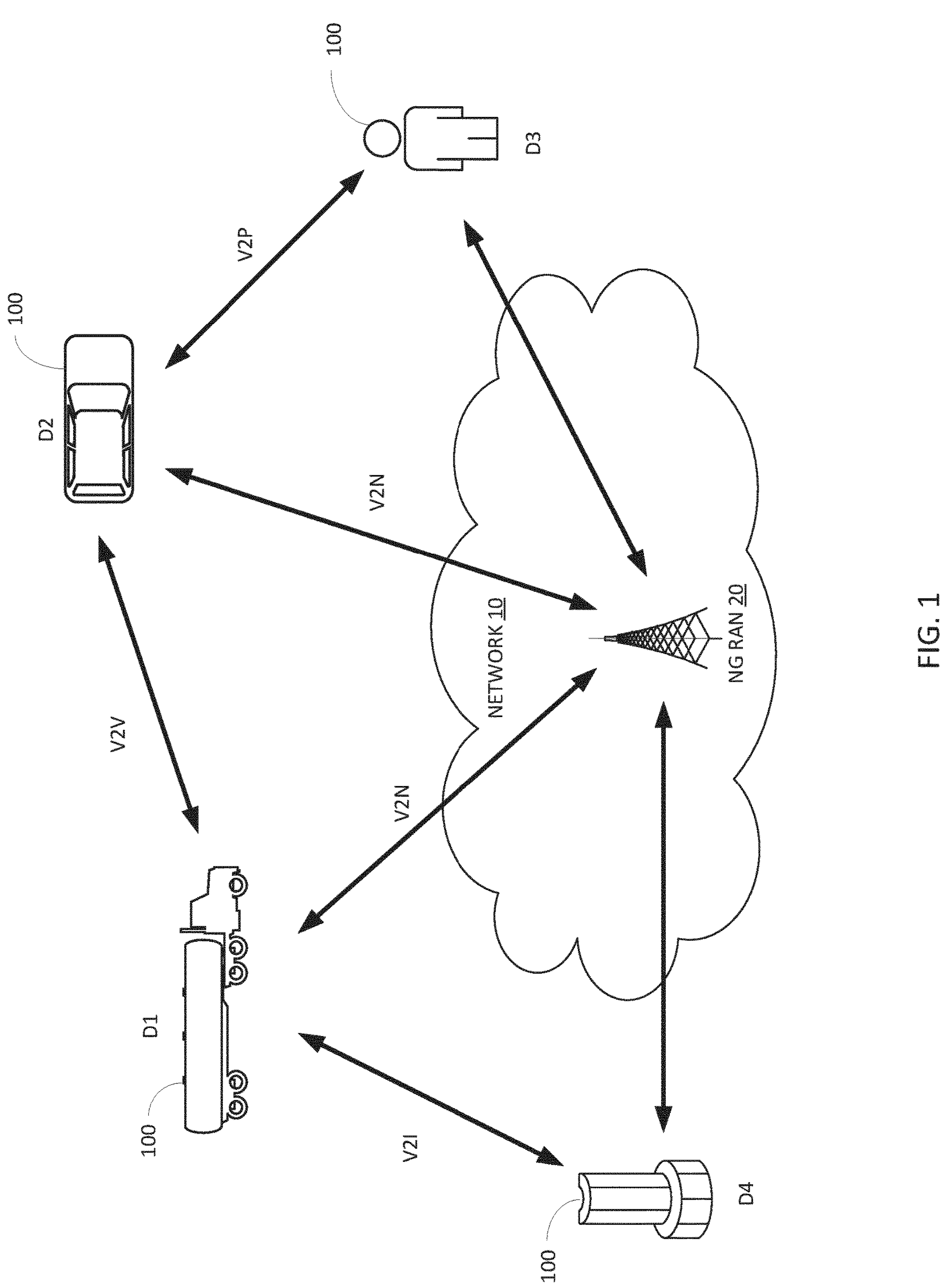
FIG. 1 illustrates an exemplary network supporting D2D communications.

Referring now to the drawings, an exemplary embodiment of the disclosure will be described in the context of a 5G or NR network. Those skilled in the art will appreciate that the methods and apparatus herein described are not limited to use in 5G or NR networks, but may also be used in other wireless communication networks 10 supporting V2X communications.

FIG. 1 illustrates a wireless communication network 10 according to the NR standard supporting V2X communications. The wireless communication network 10 comprises a Next Generation Radio Access Network (NG RAN) 20 including one or more base stations 25 providing service to user equipment (UEs) 100 in respective cells of the wireless communication network 10. The base stations 25 are also referred to as Evolved NodesBs (eNBs) in LTE and as 5G NodeBs (gNBs) in NR. A base station 25 connected to a 5G Core (5GC) 30 and implementing LTE over the air interface is referred to as a next generation eNB (ng-eNB). Although only one cell and one base station 25 are shown in FIG. 1, those skilled in the art will appreciate that a typical wireless communication network 10 comprises many cells served by many base stations 25.

The UEs 100 may comprise any type of equipment capable of communicating with the base station 25 over a wireless communication channel. For example, the UEs 100 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

FIG. 1 illustrates four UEs 100 denoted D1-D4 respectively. The UEs 100 are configured for D2D communication (e.g., V2X communication) over a sidelink (e.g. PC5 interface) and are also referred to herein as D2D devices or V2X devices. The UEs 100 may also be configured to communicate over the Uu interface. Devices D1 and D2 are carried onboard vehicles. Device D3 is mounted to some infrastructure (e.g., roadside sign). Device D4 comprises a cell phone or smart phone capable of D2D communication. In the example illustrated in FIG. 1, Device D1 is engaged in vehicle-to-vehicle (V2V) communication with Device D2 and vehicle-to-infrastructure (V2I) communication with Device D4. Device D2 is engaged in vehicle-to-vehicle (V2V) communication with Device D3 and vehicle-to-person (V2P) communication with Device D3. All four devices are capable of communication with the network 10 via base station 25.

Figure 2:
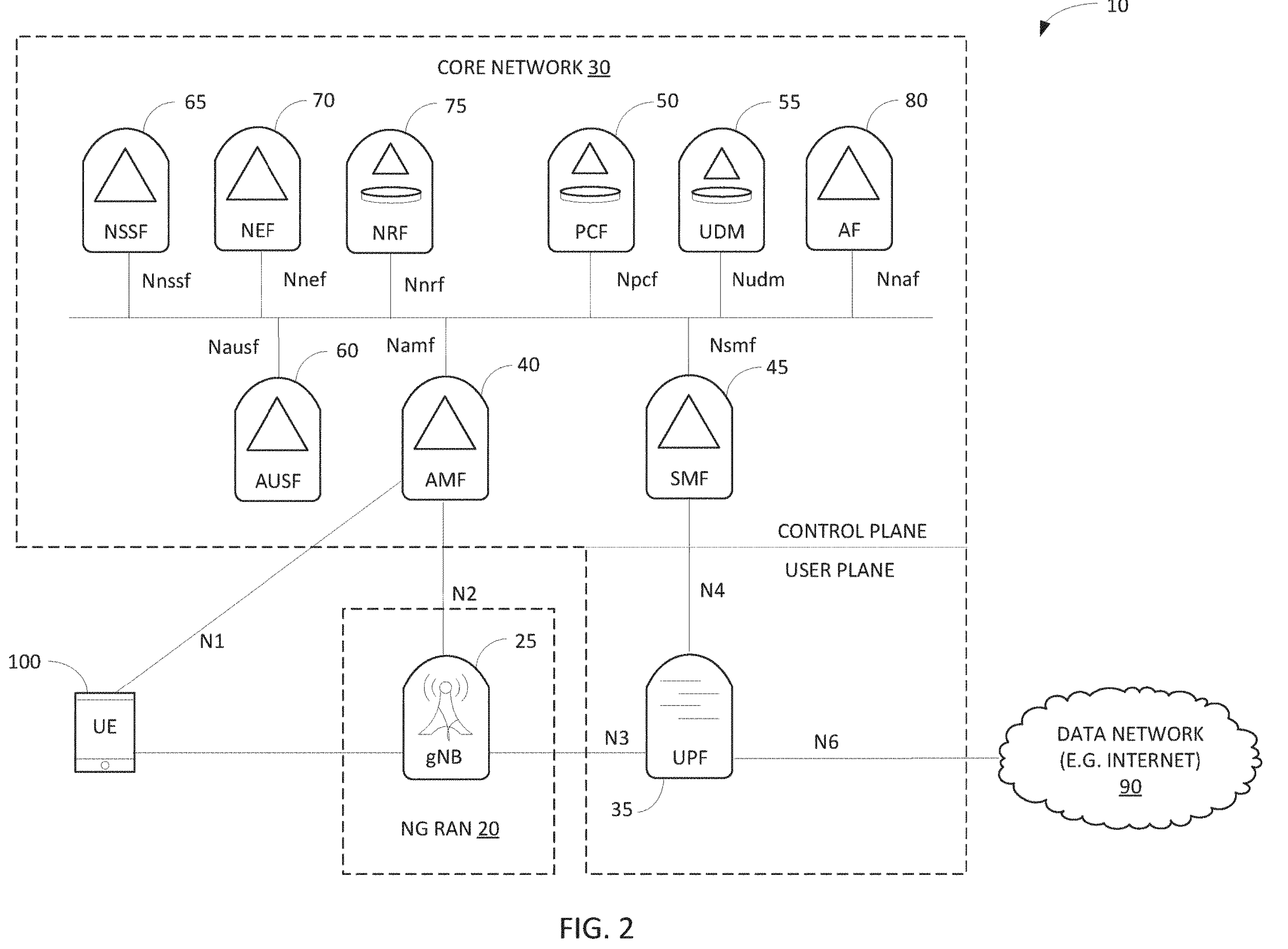
FIG. 2 illustrates a system architecture of a 5G network.

FIG. 2 illustrates the system architecture for a 5G network in more detail. The base stations 25 in the NG RAN 20 allow the UEs 100 to gain connectivity to the 5GC 30. The base stations 25 could be gNBs or ng-eNBs in 5G. The 5GC 30 contains Network Functions (NFs) providing a wide range of different functionalities such as session management, connection management, charging, authentication, etc. The % GC 30 includes a user plane and a control plane. A User Plane Function (UPF) 35 in the user plane provides connection to an external data network 90. In one exemplary embodiment, the NFs in the control plane include a an Access And Mobility Management Function (AMF) 40, a Session Management Function (SMF) 45, a Policy Control Function (PCF) 50, a Unified Data Management (UDM) function 55, a Authentication Server Function (AUSF) 60, a Network Slice Selection Function (NSSF) 65, a Network Exposure Function (NEF) 70, a Network Repository Function (NRF) 75 and one or more Application Functions (AFs) 80. These NFs comprise logical entities that reside in one or more core network nodes, which may be implemented by one or more processors, hardware, firmware, or a combination thereof. The various network functions may reside in a single core network node or may be distributed among two or more core network nodes. As another example, a network node may be a virtual network node as described in more detail below. In exemplary embodiments herein described, an AF 80 is configured as a V2X server to provide support for V2X services.

In conventional wireless communication network, the various NFs (e.g., SMF 45, AMF 40, etc.) in the 5GC 30 communicate with one another over predefined interfaces. In the service-based architecture shown in FIG. 1, instead of predefined interfaces between the control plane functions, the wireless communication network 10 uses a services model in which the NFs query the NRF 75 or other NF discovery node to discover and communicate with each other.

The communication links between the UE 100 and the network 10 can be grouped in two different strata. The UE 100 communicates with the 5GC 30 over the Non-Access Stratum (NAS), and with the NG RAN 20 over the Access Stratum (AS). All the NAS communication takes place between the UE 100 and the AMF 40 in the 5GC 30 over the NAS protocol (N1 interface in FIG. 1). Protection of the communications over this these strata is provided by the NAS protocol for NAS messages and the Packet Data Conversion Protocol (PDCP) protocol for AS messages.

More details on the 5G security can be found in TS 33.501, but in general, the security mechanisms for these protocols rely on multiple different security keys. In the 5G security specification, these keys are organized in a hierarchy. At the top level there is the long-term key part of the authentication credential that is stored in the SIM card on the UE side and in the UDM 55 or Authentication Credential Repository and Processing Function (ARPF) of the home Public Land Mobile Network (PLMN).

A successful primary authentication run between the UE 100 and the AUSF 50 in the home PLMN leads to the establishment of the KAUSF key, which is the second level key in the key hierarchy. This key is not intended to leave the home PLMN and is used for new features introduced in the 5G System, such as for the provisioning of parameters to the UE 100 from the home PLMN. More precisely the KAUSF key is used for the integrity protection of the messages delivered from the home PLMN to the UE 100. As described in TS 33.501, such new features include the Steering of Roaming (SoR) and the UDM parameter delivery procedures.

The KAUSF is in used to derive another key (KSEAF) that is sent to the serving PLMN, also referred to as the visited PLMN. The serving PLMN key is then used to derive the subsequent NAS and AS protection keys. These lower level keys together with other security parameters such as the cryptographic algorithms, the UE security capabilities, the value of the counters used for replay protection in the different protocols, etc., constitute what is defined as the 5G security context in TS 33.501. It should be noted that KAUSF is not part of the 5G security context since 5G security context resides in the serving network.

Figure 3:
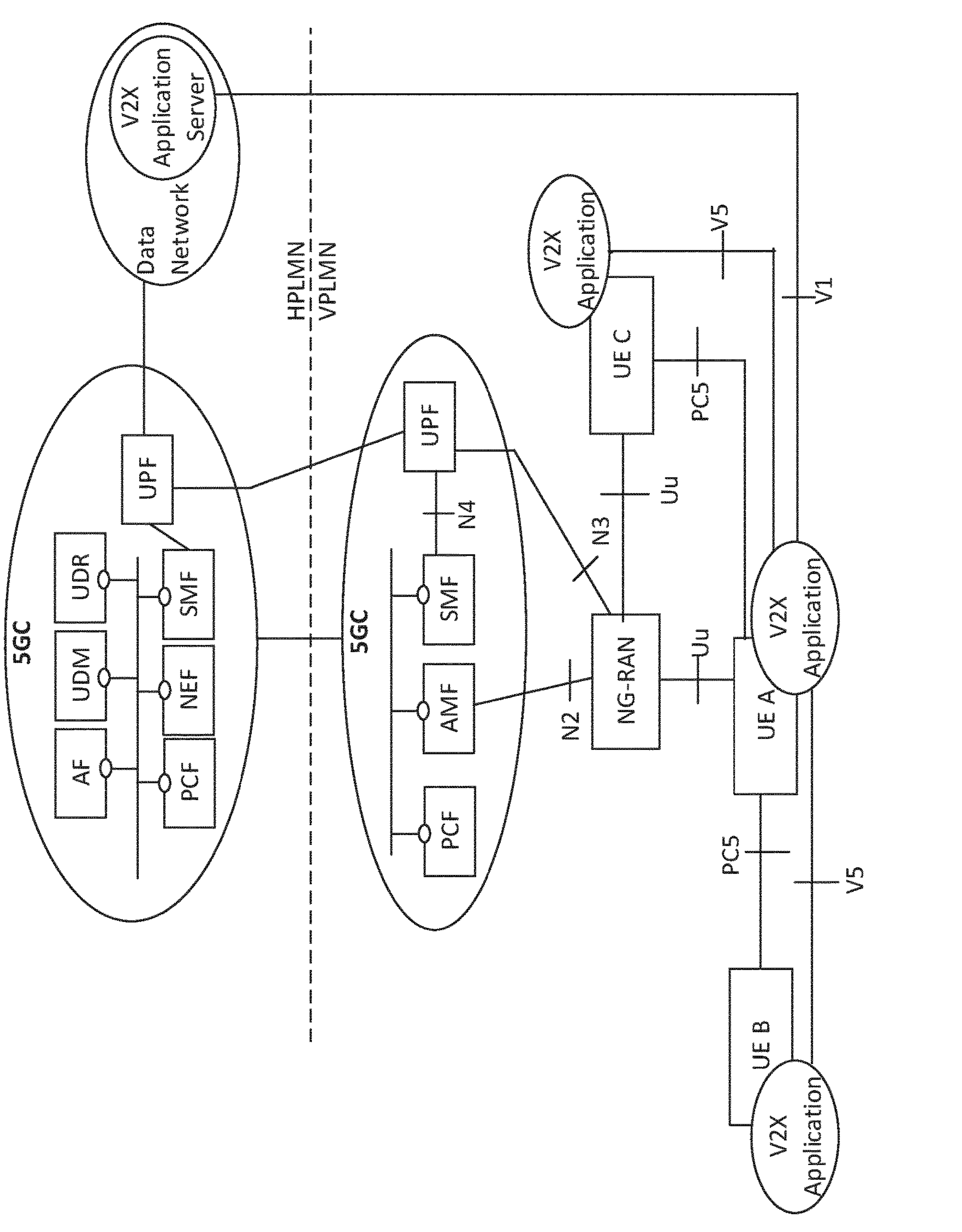
FIG. 3 illustrates system architecture for V2X communications.

The work on Release 16 for 5G is currently ongoing. This release is expected to deliver many new features, such as additional support of vehicular communication (e.g., V2X). The architecture work has been finalized by the architecture group SA2 and is described in TS 23.287. FIG. 3 shows the roaming architecture for V2X-capable UEs 100. As seen in FIG. 3, V2X applications hosted on or associated with the UEs 100 roaming in a visited Public Land Mobile Network (PLMN), denoted UE A-C in FIG. 3, communicate with other V2X applications over the V5 interface, and with a V2X server in the home in the home PLMN over the V1 interface.

Compared to the V2X architecture in EPS, the 5G architecture does not include a separate V2X control function in the core network. In the 5G architecture, the V2X control function role is endorsed by the PCF 50. More particularly, the provisioning of the necessary parameters for V2X communication to the UE 100, is done by the PCF 50 in the home network of the UE 100 using the policy delivery and modification procedures described in TS 23.502 and TS 23.503.

For V2X communication, two interfaces could be used. The UE 100 can use the usual Uu interface, i.e., air interface, between the UE 100 and the base station 25. The UE 100 can also use the PC5 interface, a.k.a. the sidelink, introduced during the development of the proximity service features for LTE in Release 14. Depending on the radio access technology (RAT) used, the sidelink can be LTE or NR-based. In contrast to the LTE-based PC5, the NR-based PC5 interface is extended to support not only broadcast communication, but also groupcast and unicast communication. In addition, for unicast communication, the NR-based PC5 interface will have separate control and user planes.

One aspect of the disclosure comprises security mechanisms to protect the L2 identifiers used in groupcast communications over the sidelink (e.g., PC5 interface). The exemplary security mechanisms described herein rely on the introduction of new privacy parameters provisioned to the UE to facilitate the privacy protection of destination L2 identifiers for group communication. The new privacy parameters allow the UE to change the destination L2 identifier so that an eavesdropper on the PC5 interface can no longer link several broadcast messages originating from the source UE 100 and pertaining to a specific group.

The change of the destination L2 identifiers may be triggered by the application layer. In one example, the application layer sends an indication to the lower layer indicating that explicitly or implicitly indicates that a change of the current destination L2 identifier is needed. Responsive to such indication, the UE 100 uses the received parameters to determine a new destination L2 identifier and uses that one in any future groupcast message for the corresponding group. In one embodiment, the indication comprises a Boolean flag that is set to a predetermined value to indicate when a change of the destination L2 identifier is need. In another embodiment, the application layer may provide an explicit request to L2 to change the destination L2 identifier.

Preferably, a change of the current destination L2 identifier is synchronized with a change of the source Layer 2 Identifier. In this manner the linkability threat is mitigated even further. Following a simultaneous change in the source and destination L2 identifiers, it becomes even more difficult for an eavesdropper to infer whether the message is originating from the source and whether it pertains to the same group. In this embodiment, the application layer may provide an indication to change the source L2 identifier and the UE changes both the source L2 identifier and the destination L2 identifier at the same time.

The privacy parameters can be provisioned by the network during the authorization procedure. More precisely, the privacy can be provisioned by the PCF 50 during the PCF-based authorization procedure as described in TS 23.287, § 6.2.2. These additional parameters may be included in the policy container and delivered to the UE as defined in § 0.2.4.3 "UE Configuration Update procedure for transparent UE Policy Delivery" in TS 23.502. The additional parameters can be included along with any other policy parameters related to privacy as described in TS 23.287, § 5.1.2.1, bullet 4. In another embodiment, the additional parameters can be provided to the UE by the V2X application server over the V1 interface once the UE establishes communication with it.

The PCF 50 may determine that the provisioning of the groupcast privacy parameter is required based on subscription information or based on local information. The PCF 50 may be configured by the operator with the list of V2X groups that are privacy sensitive, in which case the PCF 50 provisions all the corresponding members with the privacy parameters during the authorization procedure. The privacy sensitive groups are also referred to herein as protected groups. Alternatively, the PCF 50 may fetch or receive this information from the V2X application server or another core network entity such as the UDM 55.

In one embodiment, the groupcast privacy parameter consists of a group-specific list of destination L2 identifiers. The UE 100 rotates through the list when engaging in groupcast communication with the corresponding group. Observe that in case the UE 100 is authorized to communicate with more than one privacy sensitive group, it is important that such pools of identifiers are mutually exclusive.

In another embodiment, the privacy parameter can be a group-specific range or interval of L2 identifiers from which the UE 100 can randomly choose a value to use for groupcast communication with the corresponding group. Similar to the previous embodiment, it is important that the ranges are not overlapping in case a UE 100 is authorized to communicate with more than one privacy sensitive group.

In another embodiment, the privacy parameter comprises of a group-specific list of application layer identifiers through which a V2X application rotates when engaging in groupcast communication with the corresponding group. In this embodiment, the UE 100 is expected to convert the application identifier into a destination L2 identifier to be used in groupcast message for the corresponding group as described in 23.287, § 5.6.1.3. It is important that this conversion preserves the range of the application identifiers otherwise it will deceive the whole purpose of the privacy mechanism. For example, the conversion function must guarantee that two different application identifiers resolve in two different L2 identifiers. In this embodiment, the application layer has the control over the privacy mechanism and the L2 only acts on the identifier provided by the upper layer.

In another embodiment, the V2X authorization information will carry the information whether the UE is authorized for groupcast. In the case information on a V2X packet is transmitted by groupcast, it will be indicated by upper layer to the AS layer. In a gNB split-based architecture, the Distributed Unit (DU) in the gNB can check whether the UE 100 is authorized for groupcast communication via implicit means. For example, the base station can check the sidelink radio bearer (SLRB) configuration of the UE 100 or sidelink (SL) resource configuration request from the gNB Central Unit (CU). If the authentication succeeds, the gNB-DU allocates SL resource for the UE 100. Otherwise, it refuses the resource application of the UE 100.

As part of the UE subscription information for V2X that is provided to the NG RAN 20, the groupcast support may be provided as well. This feature is not restricted to V2X only but can be applied to other SL-based features such as proximity services.

Figure 4:
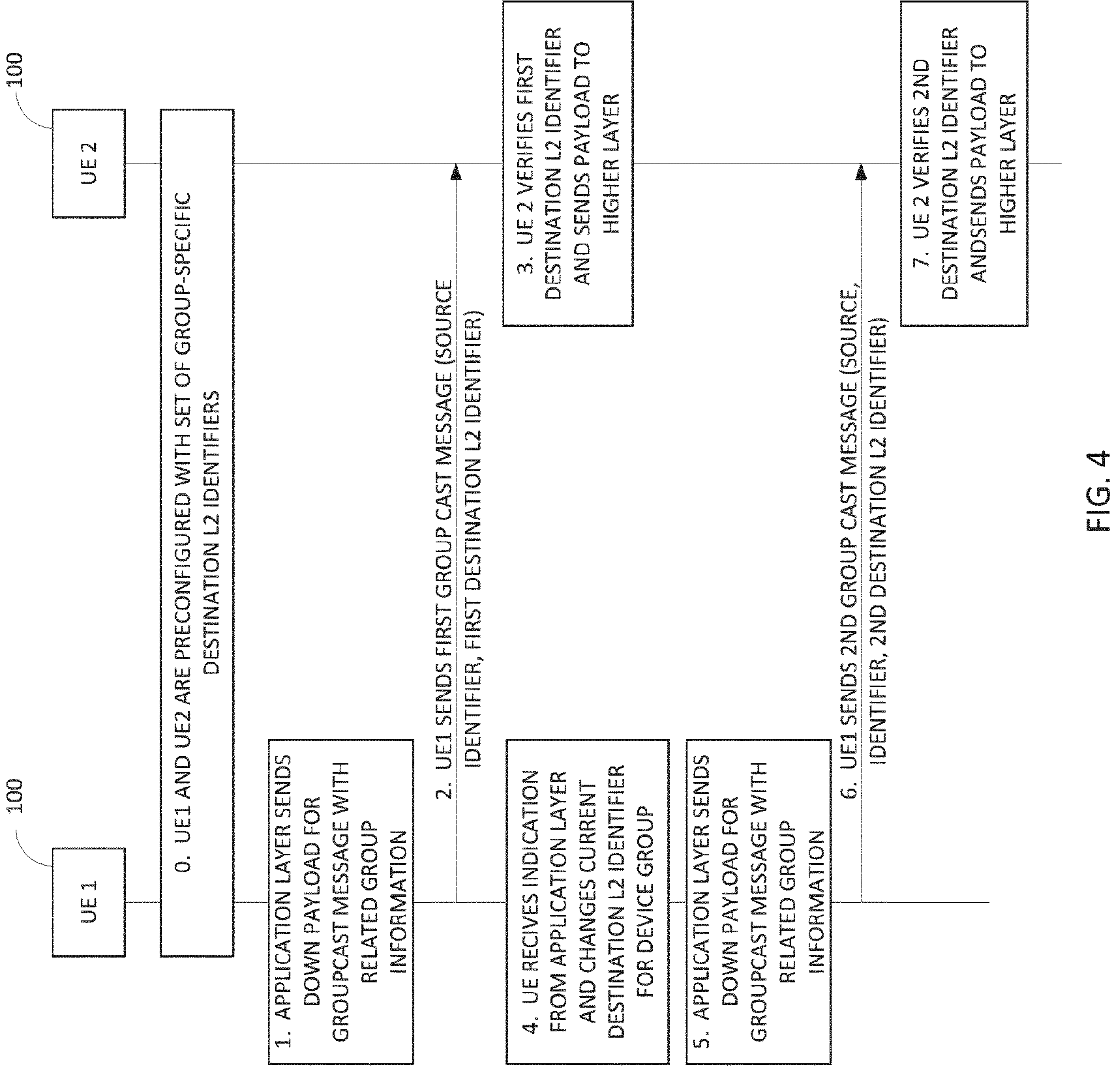
FIG. 4 is an example of groupcast communication between a sending device and a receiving device.

FIG. 4 illustrates signaling between two UEs 100 engaged in groupcast communication using group-specific destination L2 identifiers as herein described. It is assumed that the UEs 100 have been authorized for groupcast communication over the sidelink and have been provisioned with the necessary group information. The following describes one exemplary procedure for sending groupcast messages between a sending device (UE1) and a receiving device (UE 2).

1. At the sending device (UE 1), the application layer pushes down a payload intended for groupcast communication with the necessary group information, possibly including an identifier of the target group.
2. UE 1 generates and sends a first groupcast message to the target group. The groupcast message includes the current destination L2 identifier and the current source L2 identifier.
3. It is assumed that the lower layers on the receiving device (UE2) have been configured with the necessary group information for all groups in which UE2 is a member. This is to avoid protocol layer violation during the processing of the received messages. Upon reception of the first groupcast message, UE2 checks if the destination L2 identifier in the received groupcast message matches one of the group-specific destination L2 identifiers for the device group. If UE 2 is authorized for more than one group, then UE 2 may perform this check for each group until either a match is found, or no match is found for any of the groups. If a match is found, UE2 pushes the message to the application layer with an indication of the group targeted by the message. If no match is found, then the message could be discarded or pushed upwards with an error indication. If a match is found, the UE 100 pushes back the message to the application layer with an indication of the group targeted by the message. If no match is found, then the message could be discarded or pushed upwards with an error indication, etc.

4. UE1 receives indication from application layer and changes the current destination L2 identifier. Alternatively, UE1 may change the current destination L2 identifier periodically or responsive to another predetermined event.
5. At the sending device (UE 1), the application layer pushes down a payload intended for groupcast communication with the necessary group information, possibly including an identifier of the target group. In this example, it is assumed that the same group is targeted as the first group message.
6. UE 1 generates and sends a second groupcast message to the target group. The groupcast message includes, in addition to the current destination L2 identifier and the current source L2 identifier.
7. Upon reception of the second groupcast message, UE2 checks if the destination L2 identifier in the second groupcast message matches one of the group-specific destination L2 identifiers for the device group. If UE 2 is authorized for more than one group, then UE 2 may to perform this check for each group until either a match is found, or no match is found for any of the groups. If a match is found, UE2 pushes back the message to the application layer with an indication of the group targeted by the message. If no match is found, then the message could be discarded or pushed upwards with an error indication.

Figure 5:
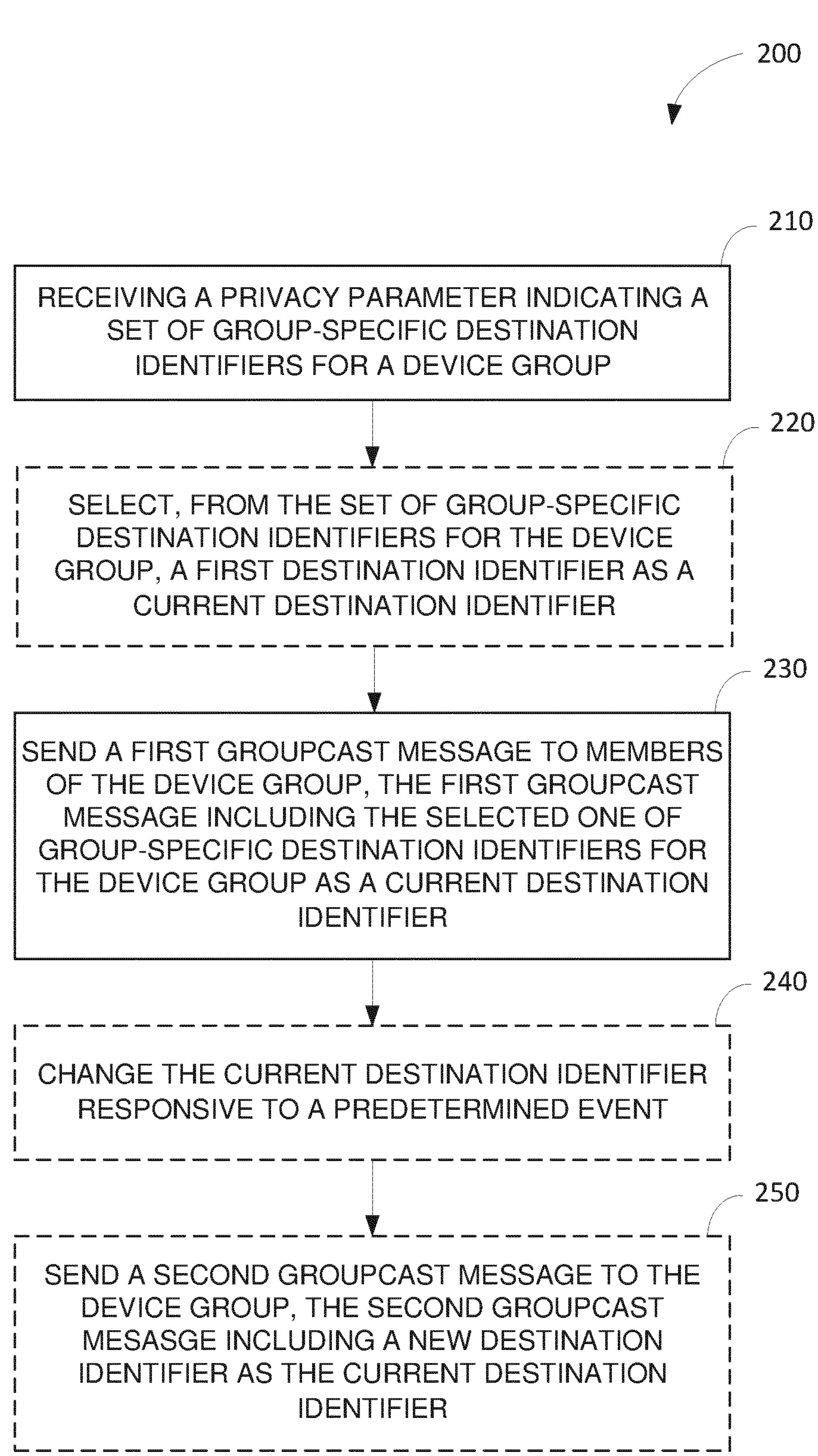
FIG. 5 illustrates an exemplary method of implemented by a UE of sending a groupcast message.

FIG. 5 illustrates an exemplary method 200 implemented by a UE 100 of sending a groupcast message to a target device group. The UE 100 receives a privacy parameter indicating a set of group-specific destination L2 identifiers for a device group (210). The UE 200 optionally selects, from the set of group-specific destination identifiers for the device group, one of the destination L2 identifiers as a current destination identifier (block 220). In some embodiments, this selection is performed by the application layer. The UE 200 sends a first groupcast message to members of the device group (230). The first groupcast message includes the selected one of group-specific destination L2 identifiers for the device group as the current destination L2 identifier (220).

Some embodiments of the method 200 further comprise changing the current destination L2 identifier responsive to a predetermined event (block 240) and sending a second groupcast message to members of the device group with the new destination L2 identifier as the current destination L2 identifier (block 250).

When selecting or changing the current destination L2 identifier, the UE 100 may select the current destination L2 identifier from the set of group-specific destination L2 identifiers according to a selection rule in blocks 220 and/or 240. In other embodiments, the UE 100 selects the destination L2 identifier randomly from the set of group-specific destination L2 identifiers.

In some embodiments of the method 200, changing the current destination L2 identifier is performed responsive to an indication from an application layer. The indication may comprise an explicit or implicit indication to change the current destination L2 identifier used for groupcast messages. In another example, the indication is an explicit or implicit indication to change a source L2 identifier used for groupcast messages. In this case, the source L2 identifier and current destination L2 identifier are changed at the same time.

In some embodiments of the method 200, the privacy parameter comprises a group-specific list of destination L2 identifiers. For example, the list of destination L2 identifiers may comprise a list of destination L2 identifiers, or a list of application layer group identifiers that map to a corresponding set of destination L2 identifiers.

In some embodiments of the method 200, sending a first groupcast message to members of the device group comprises receiving a group identifier for target device group from the application layer; and converting the group identifier for the target device group to the destination L2 identifier for the first groupcast message.

In some embodiments of the method 200, sending a second groupcast message to members of the device group comprises receiving a group identifier for the target device group from the application layer; and converting the group identifier for the target device group to the destination L2 identifier for the second groupcast message.

In some embodiments of the method 200, receiving a privacy parameter comprises sending a policy provisioning request to a network node, and receiving the privacy parameters responsive to the policy provisioning request.

In some embodiments of the method 200, the privacy parameter is provisioned by a policy control function and wherein the privacy parameters are delivered to the UE in UE Policy Container.

Figure 6:
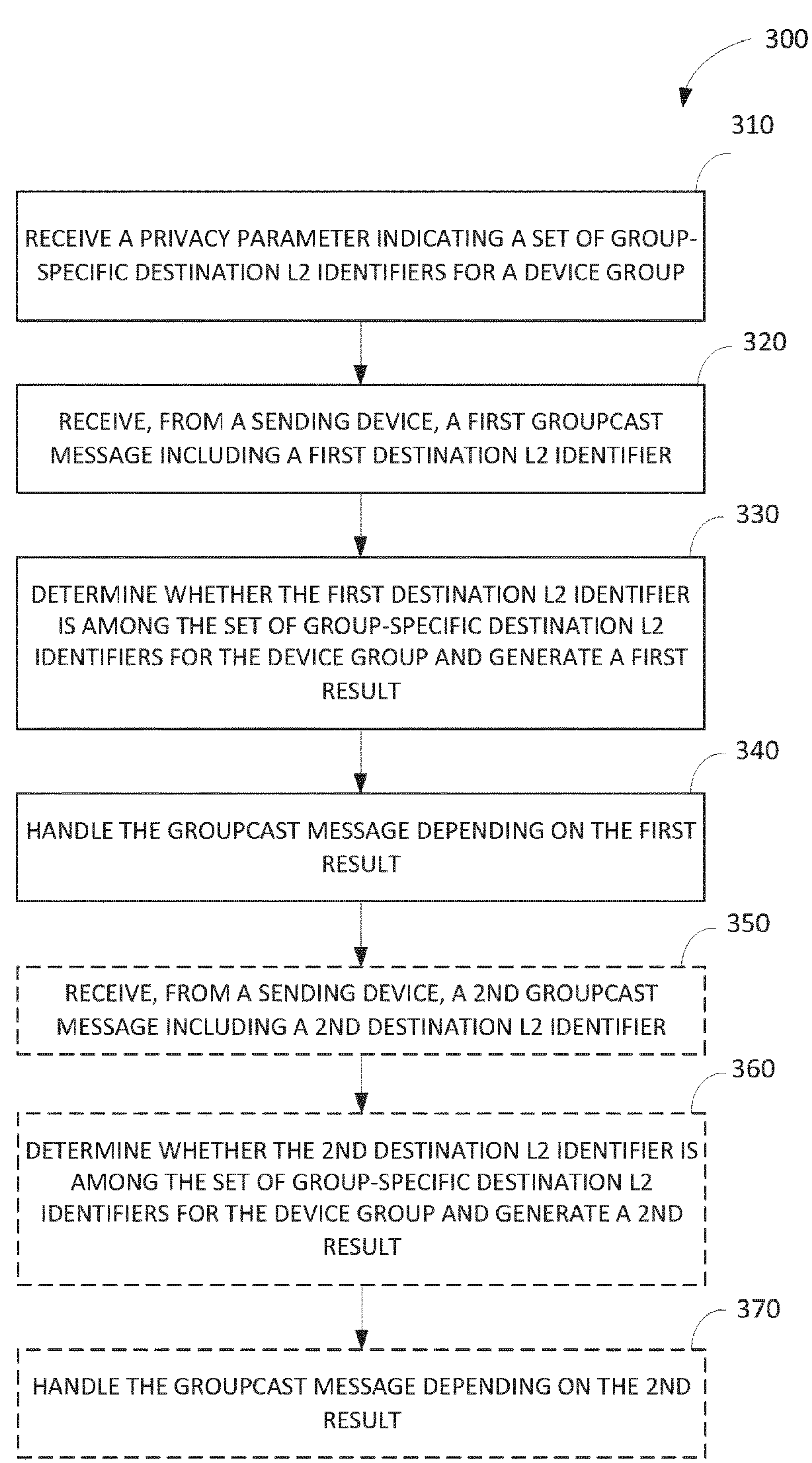
FIG. 6 illustrates an exemplary method implemented by a UE of sending a groupcast message.

FIG. 6 illustrates an exemplary method 300 implemented by a UE 100 in a device group of receiving a groupcast message intended for the device group. The UE 100 receives a privacy parameter indicating a set of group-specific destination L2 identifiers for a device group (block 310). The UE 100 further receives, from a sending device, a first groupcast including a first destination L2 identifier (block 320). The UE 100 determines whether the first destination L2 identifier is among the set of group-specific destination L2 identifiers for the device group and generates a first result (block 330). That is, the UE 100 checks whether the received destination L2 identifier matches any one of the group-specific destination L2 identifiers for the device group. The UE 100 handles the groupcast message depending on the first result (block 340). If a match is found, the UE 100 sends the payload to higher layers for further processing. If no match is found, the UE 100 discards the first groupcast message or sends the payload to higher layers with an error indication.

Some embodiments of the method 300, further comprise receiving, from the sending device, a second groupcast message including a second destination L2 identifier (block 350). The UE 100 determines whether the second destination address is among the set of group-specific destination L2 identifiers for the device group and generates a second result (block 360); and handles the second groupcast message depending on the second result (block 370). If the received destination L2 identifier matches one of the group-specific destination L2 identifiers for the device group, the UE 100 sends the payload to higher layers for further processing. If no match is found, the UE 100 discards the second groupcast or sends the payload to higher layers with an error indication.

In some embodiments of the method 300, receiving the privacy parameter comprises sending a policy provisioning request to a network node and receiving the privacy parameters responsive to the policy provisioning request.

In some embodiments of the method 300, the privacy parameter is provisioned 100 by a policy control function and wherein the privacy parameters are delivered to the UE in UE Policy Container.

In some embodiments of the method 300, the privacy parameter is received from a V2X server over the V1 interface.

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

In some embodiments, some or all of the functions described herein may be implemented as virtual components executed by one or more virtual machines implemented in one or more virtual environments hosted by one or more of hardware nodes. The functions may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in virtualization environment which provides hardware comprising processing circuitry and memory. Memory contains instructions executable by processing circuitry whereby application is operative to provide one or more of the features, benefits, and/or functions disclosed herein.

Figure 7:
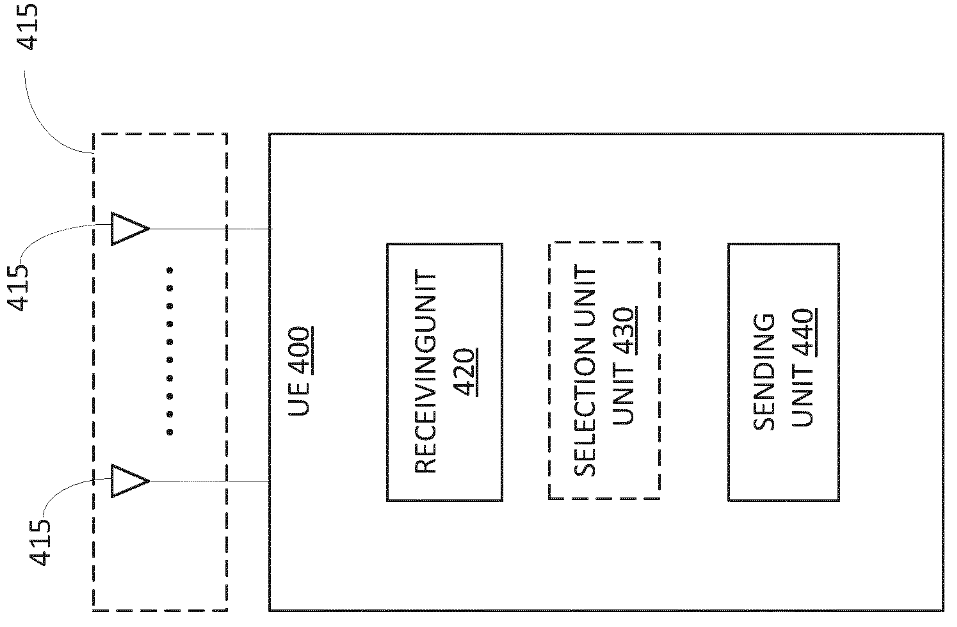
FIG. 7 illustrates an exemplary UE configured to send groupcast messages.

FIG. 7 illustrates an exemplary UE 40 configured to send a groupcast message as herein described. The UE 400 comprises an antenna array 410 having one or more antennas 415, a receiving unit 420, a selection unit 430 and a sending unit 440. The various units 420-440 can be implemented by hardware and/or by software code that is executed by one or more processors or processing circuits. The receiving unit 420 is configured to receive a privacy parameter indicating a set of group-specific destination L2 identifiers for a device group. The selection unit 430, when present, selects a destination L2 identifier from the set of group-specific destination L2 identifiers to use as a current destination L2 identifier for groupcast messages. The selection unit 340 may also be configured to change the selection of the current destination L2 identifier periodically or responsive to a predetermined event or trigger. The sending unit 440 is configured to send a first groupcast message to members of the device group, the first groupcast message including a selected one of group-specific destination L2 identifiers for the device group as a current destination L2 identifier. In some embodiments, the sending unit 440 is further configured to send a second groupcast message to members of the device group, the second groupcast message including a selected one of group-specific destination L2 identifiers for the device group as the current destination L2 identifier.

Figure 8:
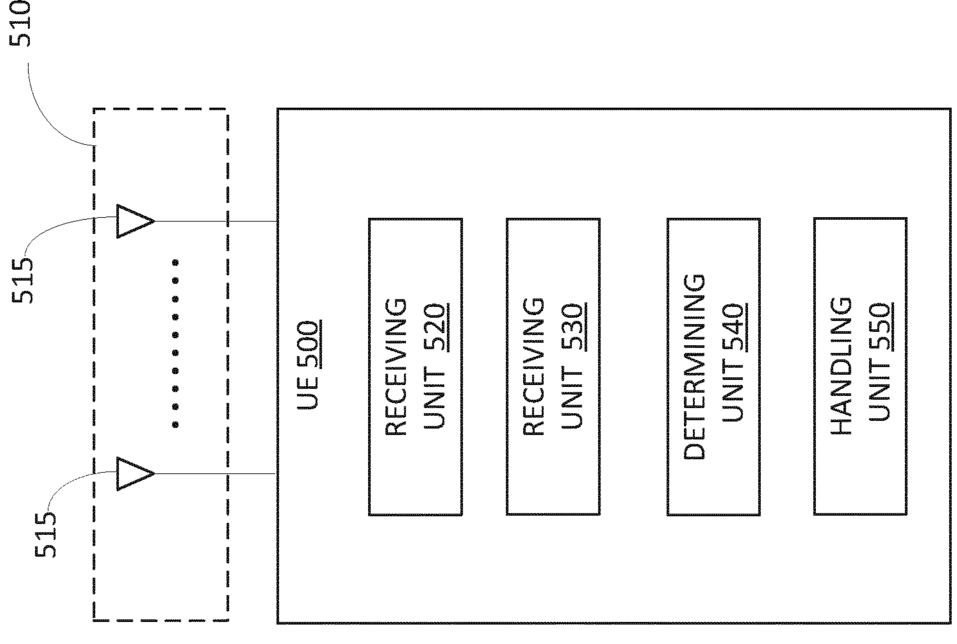
FIG. 8 illustrates an exemplary UE configured to receive groupcast messages.

FIG. 8 illustrates an exemplary UE 500 configured to receive a groupcast message as herein described. The UE 500 comprises an antenna array 510 with one or more antennas 515, a first receiving unit 520, a second receiving unit 530, a determining unit 540, and a handling unit 550. The various units 520-550 can be implemented by hardware and/or by software code that is executed by one or more processors or processing circuits. The first receiving unit 520 is configured to receive a privacy parameter indicating a set of group-specific destination L2 identifiers for a device group. The second receiving unit 530 is configured to receive, from a sending device, a first groupcast message including a first destination L2 identifier group identifier and a source L2 identifier. The determining unit 540 is configured to determine whether the first destination L2 identifier is among the set of group-specific destination L2 identifiers for the device group and to generate a first result indicative of the outcome of the determination. The handling unit 550 is configured to handle the groupcast message depending on the first result.

In some embodiments, the second receiving unit 530 is further configured to receive, from the sending device, a second groupcast message including a second destination L2 identifier group identifier and a source L2 identifier. For this embodiment, the determining unit 440 is configured to determine whether the second destination L2 identifier is among the set of group-specific destination L2 identifiers for the device group and to generate a second result indicative of the outcome of the determination. The handling unit 450 is further configured to handle the groupcast message depending on the second result.

Figure 9:
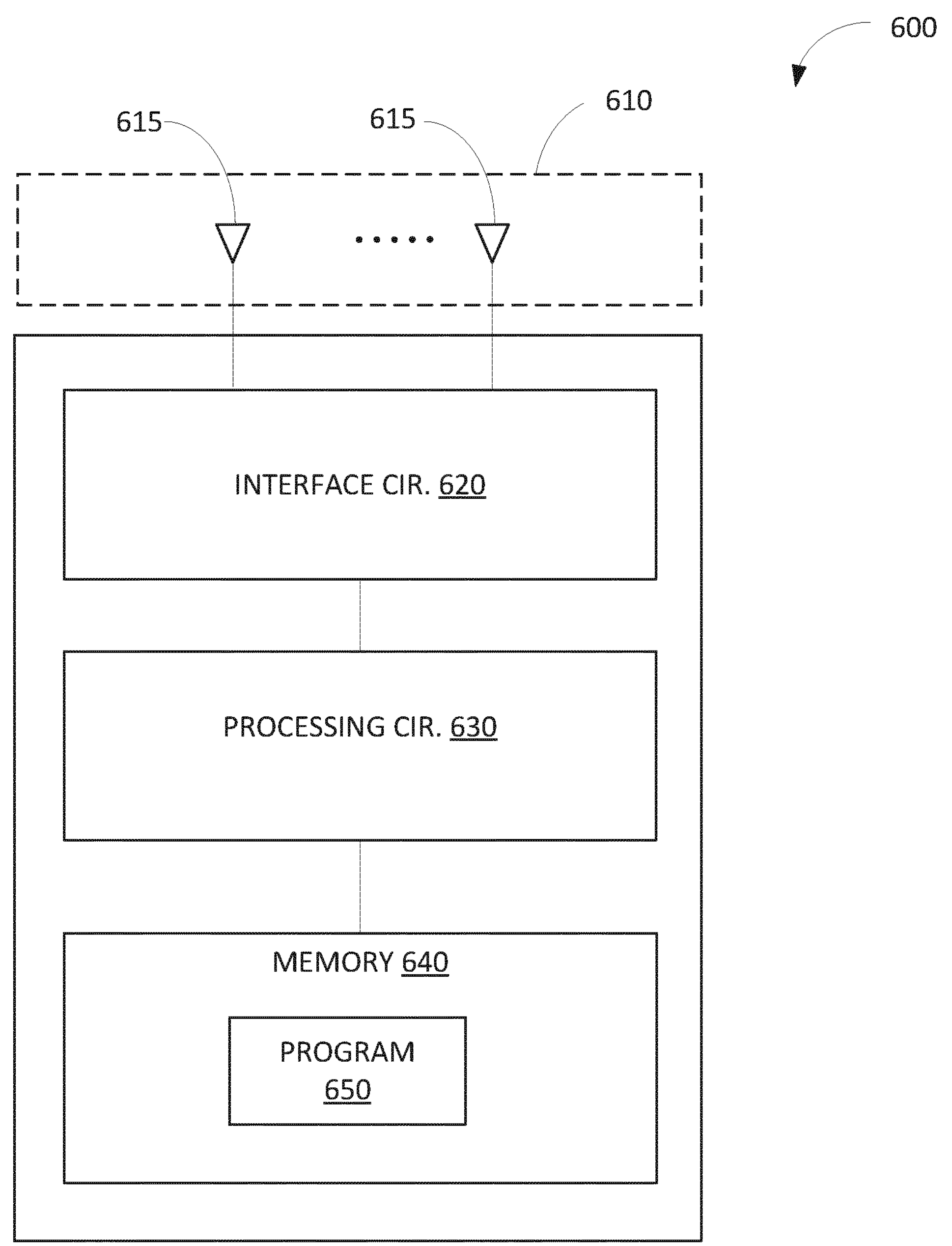
FIG. 9 illustrates an exemplary UE device configured for groupcast communication.

FIG. 9 illustrates an exemplary UE 600 configured to send and/or receive D2D groupcast messages as herein described. The UE device 600 comprises an antenna array 610 with multiple antenna elements 616, an interface circuit 620, a processing circuitry 630, and memory 640.

The interface circuit 620 is coupled to the antennas 616 and comprises the radio frequency (RF) circuitry needed for transmitting and receiving signals over a wireless communication channel. In one embodiment, the interface circuit 620 comprises a transceiver configured to operate according to the NR standard and is capable of D2D communication (e.g., V2X) over the sidelink (e.g., PC5 interface).

The processing circuitry 630 controls the overall operation of the UE 600 and processes the signals transmitted to or received by the UE 600. Such processing includes coding and modulation of transmitted data signals, and the demodulation and decoding of received data signals. The processing circuitry 630 may comprise one or more microprocessors, hardware, firmware, or a combination thereof. The processing circuitry 930 is configured to perform the methods as herein described.

Memory 640 comprises both volatile and non-volatile memory for storing computer program code and data needed by the processing circuit 660 for operation. Memory 640 may comprise any tangible, non-transitory computer-readable storage medium for storing data including electronic, magnetic, optical, electromagnetic, or semiconductor data storage. Memory 640 stores a computer program 650 comprising executable instructions that configure the processing circuitry 630 to implement the methods 200 and/or 300 as described herein. A computer program 650 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, the computer program 650 for configuring the processing circuitry 630 as herein described may be stored in a removable memory, such as a portable compact disc, portable digital video disc, or other removable media. The computer program 650 may also be embodied in a carrier such as an electronic signal, optical signal, radio signal, or computer readable storage medium.

Figure 10:
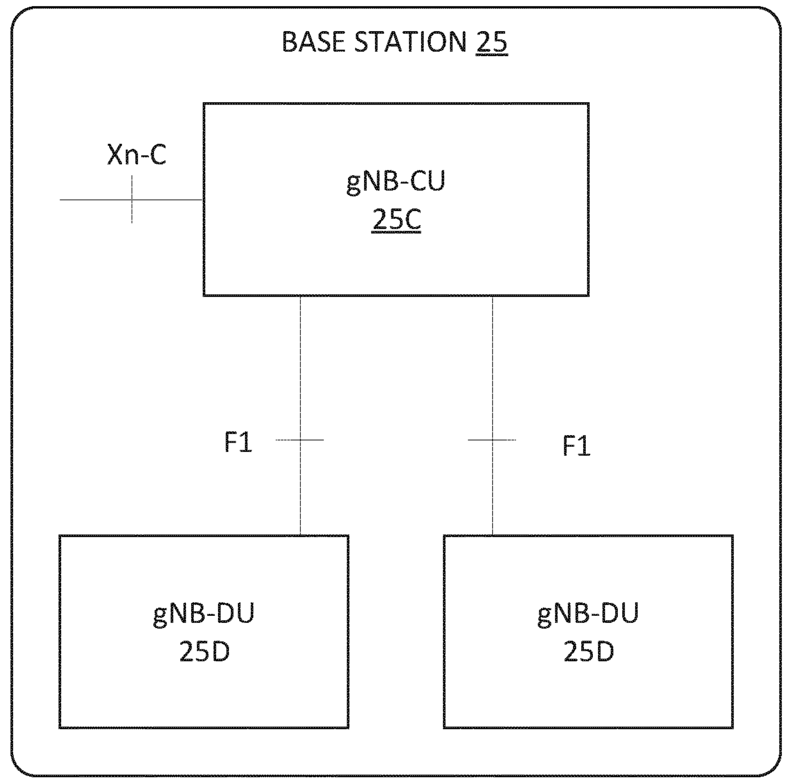
FIG. 10 illustrates an exemplary base station with a split architecture.

FIG. 10 illustrates an exemplary base station 25 with a split architecture. The base station 25 comprises a central unit (gNB-CU) 25C and one or more distributed units (gNB-DU) 25D. In the case information on a V2X packet is transmitted by groupcast, the distributed unit 25D in the base station 25 checks whether the UE 100 is authorized for groupcast communication via implicit means. For example, the base station 25 can check the sidelink radio bearer (SLRB) configuration of the UE 100 or sidelink (SL) resource configuration request from the gNB Central Unit (CU). If the authentication succeeds, the distributed unit 25D in the base station 25 allocates SL resource for the UE 100. Otherwise, the distributed unit 25D in the base station 25 does not allocate resources of the UE 100 for the sidelink communication.

Figure 11:
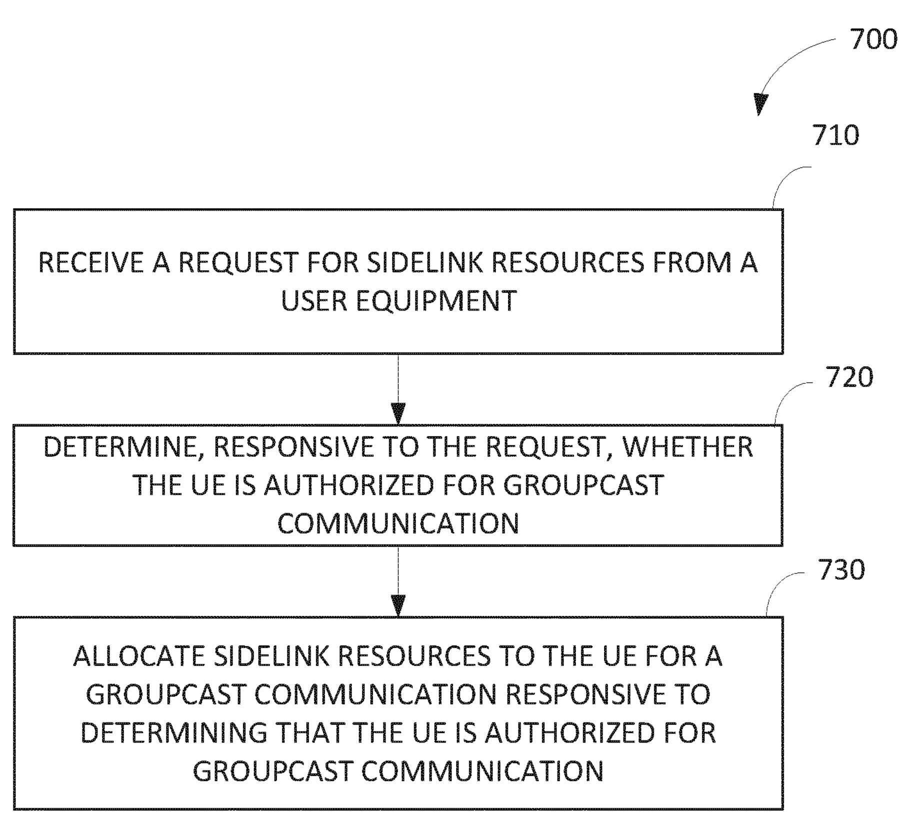
FIG. 11 illustrates an exemplary method implemented by a base station supporting group communications among UEs in a device group.

FIG. 11 illustrates an exemplary method 700 implemented by a base station 25 to support groupcast communications among UEs 100 in a device group. The base station 25 receives a request for sidelink resources from a user equipment (UE) in the device group (block 710). Responsive to the request, the base station 25 determines whether the UE 100 is authorized for groupcast communication (block 720). If the UE 100 is authorized for groupcast communication, the base station 25 allocates sidelink resources to the UE 100 for a groupcast communication responsive to determining that the UE 100 is authorized for groupcast communication (block 730).

In some embodiments of the method 700, the base station 25 determines whether the UE is authorized for groupcast communication based on a sidelink radio bearer configuration.

In other embodiments of the method 700, the base station 25 determines whether the UE is authorized for groupcast communication based on a sidelink resource request.

In some embodiments of the method 700, the base station 25 has a split architecture including a central unit and a distributed unit and the method is performed by the distributed unit.

Figure 12:
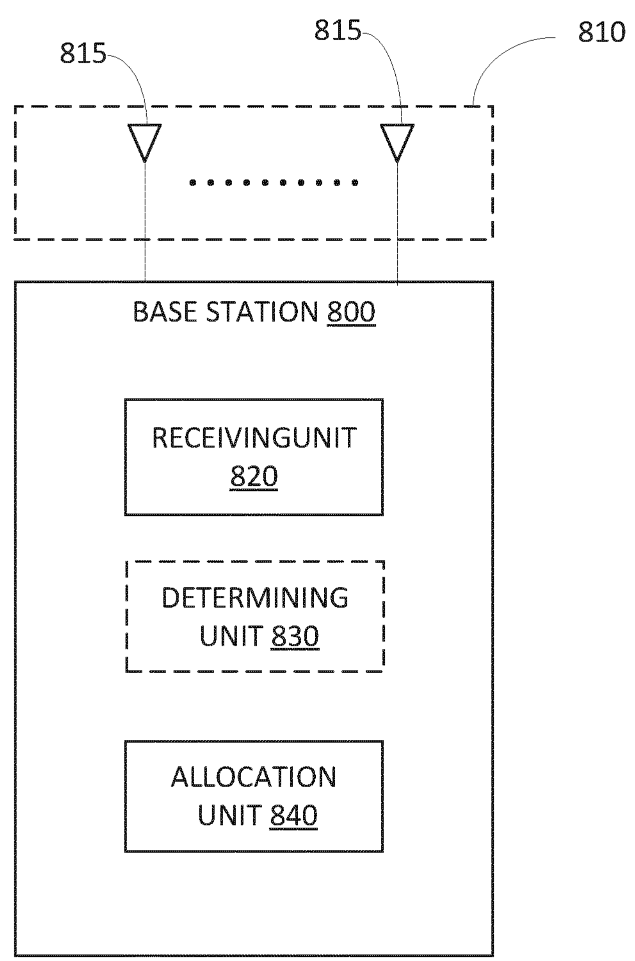
FIG. 12 illustrates an exemplary base station configured to support group communications among UEs in a device group.

FIG. 12 illustrates an exemplary base station 800 configured to support groupcast communication among UEs 100 in a device group. The base station 800 comprises an antenna array 810 with one or more antennas 815, a receiving unit 820, a determining receiving unit 830, and a handling unit 840. The various units 820-840 can be implemented by hardware and/or by software code that is executed by one or more processors or processing circuits. The receiving unit 820 is configured to receive a request for sidelink resources from a UE 100. The determining unit 830 is configured to determine, responsive to the request, whether the UE 100 is authorized for groupcast communication. The allocation unit 840 is configured to allocate sidelink resources to the UE 100 for a groupcast communication responsive to determining that the UE 100 is authorized for groupcast communication. The allocation unit 840 may reject the request if the UE 100 is not authorized for groupcast communication.

Figure 13:
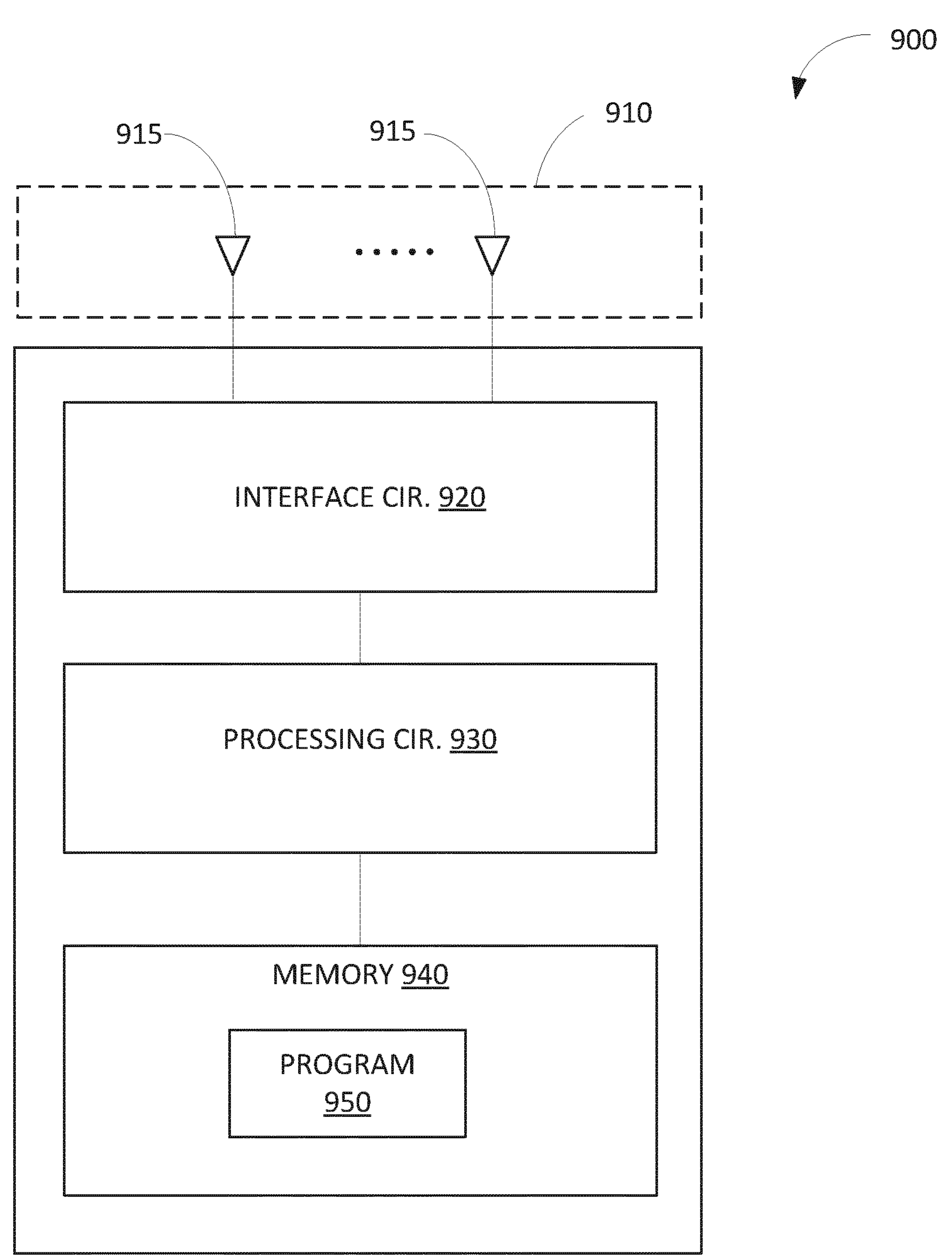
FIG. 13 illustrates an exemplary base station device configured support group communications among UEs in a device group.

FIG. 13 illustrates an exemplary base station 900 configured to send and/or receive D2D groupcast messages as herein described. The base station 900 comprises an antenna array 910 with multiple antenna elements 919, an interface circuit 920, a processing circuitry 930, and memory 940.

The interface circuit 920 is coupled to the antennas 919 and comprises the radio frequency (RF) circuitry needed for transmitting and receiving signals over a wireless communication channel. In one embodiment, the interface circuit 920 comprises a transceiver configured to operate according to the NR standard and is capable of D2D communication (e.g., V2X) over the sidelink (e.g., PC5 interface).

The processing circuitry 930 controls the overall operation of the base station 900 and processes the signals transmitted to or received by the base station 900. Such processing includes coding and modulation of transmitted data signals, and the demodulation and decoding of received data signals. The processing circuitry 930 may comprise one or more microprocessors, hardware, firmware, or a combination thereof. The processing circuitry 930 is configured to perform the methods as herein described.

Memory 940 comprises both volatile and non-volatile memory for storing computer program code and data needed by the processing circuit 990 for operation. Memory 940 may comprise any tangible, non-transitory computer-readable storage medium for storing data including electronic, magnetic, optical, electromagnetic, or semiconductor data storage. Memory 940 stores a computer program 950 comprising executable instructions that configure the processing circuitry 930 to implement the method 700 as described herein. A computer program 950 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, the computer program 950 for configuring the processing circuitry 930 as herein described may be stored in a removable memory, such as a portable compact disc, portable digital video disc, or other removable media. The computer program 950 may also be embodied in a carrier such as an electronic signal, optical signal, radio signal, or computer readable storage medium.

Those skilled in the art will also appreciate that embodiments herein further include corresponding computer programs 650. A computer program 650 comprises instructions which, when executed on at least one processor of an apparatus, cause the apparatus to carry out any of the respective processing described above. A computer program 650 in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The security protocol for concealing group identifier as herein described does not require additional signaling other than the inclusion of additional parameters in existing signaling messages. The security protocol mitigates against the UE tracking threat while engaging in groupcast communication. The security protocol reuses the legacy mechanism for source L2 Identifier privacy protection.

What is claimed is:

1. A method implemented by a user equipment (UE) configured for vehicle to everything (V2X) communication, the method comprising:

- receiving, from a network node in a wireless communication network or V2X server, a privacy parameter indicating a set of two or more group-specific destination identifiers for the same device group from which the UE selects a group-specific destination identifier for a groupcast message;
- sending a first groupcast message to members of the device group, the first groupcast message including a selected one of group-specific destination identifiers indicated for the device group as a current destination identifier;
- selecting, responsive to a predetermined event, another of the group-specific destination identifiers as a new destination identifier; and
- sending a second groupcast message to members of the device group, the second groupcast message including the new destination identifier.

2. The method of claim 1, wherein the new destination identifier is selected responsive to an indication from an application layer.

3. The method of claim 2, wherein the new destination identifier is selected responsive to an indication from an application layer to change the current destination identifier used for groupcast messages.

4. The method of claim 2, wherein the new destination identifier is selected responsive to an indication from an application layer to change a source destination identifier used for groupcast messages.

5. The method of claim 2, wherein the selecting the new destination identifier comprises selecting the new destination identifier from the set of group-specific destination identifiers according to a selection rule.

6. The method of claim 2, wherein the selecting the new destination identifier comprises randomly selecting the new destination identifier from the set of group-specific destination identifiers.

7. The method of claim 1, further comprising sending a second groupcast message to members of the device group, the second groupcast message including the new destination identifier as the current destination identifier.

8. The method of claim 1, wherein the privacy parameter comprises a group-specific list of destination identifiers.

9. The method of claim 8, wherein the list of destination identifiers comprises a list of destination Layer 2 identifiers.

10. The method of claim 8, wherein the list of destination identifiers comprises a list of application layer group identifiers that map to a corresponding set of destination Layer 2 (L2) identifiers.

11. The method of claim 10, wherein the sending the first groupcast message to members of the device group comprises:

- receiving a group identifier for the target group from an application layer; and
- converting the group identifier for the target device group to the destination L2 identifier for the first groupcast message.

12. The method of claim 11, further comprising:

- sending a second groupcast message to members of the device group, wherein the sending a second groupcast message to members of the device group comprises:
  - receiving a group identifier for the target device group from the application layer; and
  - converting the group identifier for the target device group to the destination L2 identifier for the second groupcast message.

13. The method of claim 1, wherein receiving a privacy parameter comprises:

- sending a policy provisioning request to a network node; and
- receiving the privacy parameters responsive to the policy provisioning request.

14. The method of claim 13, wherein the privacy parameter is provisioned by a policy control function, and wherein the privacy parameters are delivered to the UE in a UE Policy Container.

15. The method of claim 1, wherein the privacy parameter is received from a Vehicle-to-Everything (V2X) server.

16. A method implemented by a user equipment (UE) configured for vehicle to everything (V2X) communication of receiving a groupcast message, the method comprising:

- receiving, from a network node in a wireless communication network or V2X server, a privacy parameter indicating a set of two or more group-specific destination identifiers for the same device group from which the UE selects a group-specific destination identifier for a groupcast message;
- receiving, from a sending device, a first groupcast message including a first destination identifier;
- determining whether the first destination identifier is among the set of group-specific destination identifiers for the device group and generating a first result; and handling the groupcast message depending on the first result;
  - selecting, responsive to a predetermined event, another of the group-specific destination identifiers as a new destination identifier; and
  - sending a second groupcast message to members of the device group, the second groupcast message including the new destination identifier.

17. A user equipment UE configured for groupcast communication, the UE comprising:

- an interface circuit configured for vehicle to everything (V2X) over a sidelink; processing circuitry configured to:
- receive, from a network node in a wireless communication network or V2X server, a privacy parameter indicating a set of two or more group-specific destination identifiers for device group from which the UE selects a group-specific destination identifier for a groupcast message;

send a first groupcast message to members of the device group, the first groupcast message including a selected one of group-specific destination identifiers for the device group as a current destination identifier;

select, responsive to a predetermined event, another of the group-specific destination identifiers as a new destination identifier; and send a second groupcast message to members of the device group, the second groupcast message including the new destination identifier.

18. The UE of claim 17, wherein the processing circuitry is configured to select the new destination identifier from the set of group-specific destination identifiers responsive to an indication from an application layer.

* * * * *